3,709,777
PHTHALATE POLYMER IMPREGNATED SHEET
Toshio Takikawa, Toyonaka, Kouji Satomo, Amagasaki, and Takashi Kodama, Nishinomiya, Japan, assignors to Osaka Soda Co., Ltd., Osaka, Japan
No Drawing. Original application Nov. 6, 1968, Ser. No. 773,970, now Patent No. 3,671,354, dated June 20, 1972. Divided and this application June 15, 1971, Ser. No. 153,432
Int. Cl. B32b 27/10, 27/36
U.S. Cl. 161—232　　　　　　　　　　　　1 Claim

ABSTRACT OF THE DISCLOSURE

Method of manufacturing remarkably improved decorative laminate boards by utilizing resin comprising diallyl phthalate prepolymer substantially free from diallyl phthalate monomer, and a polyester composed of specific components in specific amounts; and resin-impregnated sheets in use for the manufacturing of said laminate boards.

---

This is a divisional application of Ser. No. 773,970, filed Nov. 6, 1968, now U.S. Pat. No. 3,671,354.

This invention relates to decorative laminate board and to a method of manufacturing the same, said board being made by using a resin-impregnated dry sheet for lamination which has been made by the use of an impregnating solution not incorporated with diallyl phthalate monomer as its resinous component but comprising as its resinous component a specified amount of diallyl phthalate prepolymer and an amount within a specified range of a polyester soluble in organic solvents and having a softening point of less than 30° C. This invention makes possible the manufacture commercially advantageously with an improved molding cycle a decorative laminate board having improved surface smoothness.

Heretofore, there is known a method of manufacturing a decorative laminate board which comprises using an impregnating solution consisting of diallyl phthalate prepolymer as the resinous component in solution in an organic solvent to which have been added a curing catalyst and an assistant such as a release agent, impregnating with the foregoing impregnating solution a sheet impregnable therewith, usually paper, cloth or the like which has or has not been printed with patterns, designs or figures, followed by drying to obtain a resin-impregnated dried sheet for lamination use, and thereafter overlaying this sheet on a suitable substrate and molding the layup by heating it under pressure (e.g. U.S. Pat. 3,049,458).

In this case, from the standpoint of the flow property of resin during the molding operation and the curing time, the use of a resinous component in which a small quantity of diallyl phthalate monomer has been added to the diallyl phthalate prepolymer is regarded as being necessary (e.g. U.S. Pat. 3,049,458 and Belgian Pat. 681,485). While the addition of the aforesaid monomer was held as being effective in improving the flow property during the molding operation and in shortening the curing time, it was found anew that in the case where the production was actually carried out on a commercial scale using a multistage press other problems arose which were not only difficult of solution but were of very serious nature. The most serious problem was that during the molding operation using a multistage press the curing of the resin would progress before the impregnated sheets inserted in the several stages had been exposed to uniform heat and pressure conditions to result in making the flow of the resin locally non-uniform. Namely, a phenomenon occurs in which the flow is locally too fast or too slow. And it was impossible to satisfactorily solve this condition even though the amount incorporated of the monomer or the molding conditions were adjusted with care. Moreover, these adjustments were complicated as well as difficult. Hence, it was not possible to obtain the products with good reproducibility. Consequently, the product surface had such defects as dull spots, pockmarks, swells or blisters to render their value as merchandise worthless.

Further, these defects of non-uniform curing tended to appear more so as the molding cycle was shortened by an improvement in the curing speed. Hence, it was very difficult to achieve a solution of the newly created technical problems arising from the incorporation of the aforesaid monomer, i.e. of particularly the two contradictory problems—the prevention of the aforementioned defects as well as the improvement of the molding cycle at the same time. Further, the reproducibility of the molding becomes exceedingly unsatisfactory to result in producing rejects in a number such as cannot be ignored commercially. On the other hand, the unsaturated polyesters prepared from dibasic acids such as phthalic and maleic acids and polyhydric alcohols such as propylene glycol and ethylene glycol are also used in various ways as resin for the manufacture of decorative laminate boards.

And furthermore, there has recently been proposed—not as a resin for making resin-impregnated sheets but as a solid coating composition—a powdered coating composition comprising diallyl phthalate, a solid polyester of a melting point about 35–120° C. and diallyl phthalate monomer (U.S. Pat. 3,331,891).

In the embodiment of this proposal there is also incorporated a small amount of diallyl phthalate monomer as in the case of prior proposals. And it is held that the polyester must be condensed until it becomes a solid at room temperature, i.e. its melting point must be higher than 35° C.

Further, there is also known—not as a resin for making resin-impregnated sheets but as a thermosetting composition—a composition containing these resinous components (Belgian Pat. 694,255).

With a view to solving the aforesaid contradictory two problems that are inevitably created anew with the improvement that is had by the incorporation of a small amount of diallyl phthalate monomer in the sheet for lamination use which has been incorporated with the diallyl phthalate resin, we furthered our researches and as a result found that for obtaining a decorative board having a good surface on a commercial scale production using a multistage press, the diallyl phthalate monomer had to be positively excluded. It was also found, however, that a satisfactory resin-impregnated sheet for lamination use could not possibly be obtained by just the mere exclusion of the monomer. Accordingly, the combination of diallyl phthalate polymer and polyester having attracted our attention, we engaged in much research concerning a resin solution for impregnation use wherein were used as the resinous component diallyl phthalate prepolymer and a polyester and wherein was not contained the diallyl phthalate monomer as a resinous component. As a result of this research, we discovered a surprising fact; namely, that the aforesaid two contradictory problems could be solved at once by using a resinous component not incorporated with diallyl phthalate monomer, which was heretofore regarded as being necessary for improving the flow property during the molding operation and the curing time, but using instead as the resinous component 100 parts by weight of diallyl phthalate prepolymer and 20–80 parts by weight of a polyester having a softening point of less than 30° C. and soluble in solvents at room temperature, which is obtained from a specific mixed dibasic acid component and a mixed polyhydric alcohol component.

Composition other than that hereinabove indicated were prepared varying the molecular weight of the prepolymer, the acid and alcohol components making up the polyester, as well as the proportion of the prepolymer to the polyester and the concentration of resin solution. These resin solutions were used and resin-impregnated sheets were made, followed by lamination of the so-obtained sheets to substrates. However, satisfactory results could not be obtained. When attempts were made to obtain shortened molding cycles which would be practicable, the appearance of pockmarks could not be avoided. Thus, it was found that it would be much more difficult to obtain satisfactory molded products with good reproducibility. Further, it was found that in preparing an impregnating solution by dissolving in an organic solvent in customary manner diallyl phthalate prepolymer and a solid polyester having a high softening point followed by addition of a catalyst and a release agent, room temperature operation was difficult and the preparation had to be carried out under heating conditions. In addition, troublesome interactions would occur between the two resinous components, thus making it impossible in actual operations to obtain with good reproducibility resin-impregnated sheets of uniform quality which would attain at all times the optimum state of cure under identical molding conditions. Again, we also found that unless the amount of the solvent was increased considerably, it was difficult to obtain an impregnating solution having a proper operating viscosity and also that numerous limitations were imposed as to the drying of the impregnated sheet and the choice of the type of sheet material, thus making it impossible of being employed in commercial operations. This problem was also solved to complete satisfaction when the hereinbefore described solution of a composition according to this invention was used.

It was also found that while the amount of resin impregnated in the case of the conventional diallyl phthalate resin-impregnated sheets for lamination use was usually above 60% by weight as solids content, according to this invention superior results could be obtained with a much less amount of the resin, and since the preparation of the impregnating solution was exceedingly simple, there was no possibility of the occurrence of troublesome interactions of the resin components. In addition, the amount of solvent used was less.

It is therefore an object of this invention to provide a laminate board decorated with a diallyl phthalate resin-impregnated sheet having excellent surface smoothness, the board being provided with a lesser amount of resin than the conventional products and with a shortened molding cycle whose operation and adjustment are simple and with good reproducibility.

Another object is to provide a method of manufacturing the aforesaid board and the resin-impregnated sheet to be utilized in making said board.

Other objects and advantages of this invention will be apparent from the following description of this invention.

The invention resin-impregnated dry sheet for lamination use contains 100 parts by weight of the below-indicated diallyl phthalate prepolymer (A) and 20-80 parts by weight of the below-indicated polyester (B) as the resinous component, along with the usually used additives such as a small amount of a curing catalyst and a release agent.

(A) Diallyl phthalate prepolymer.
(B) A polyester obtained from the following mixed acid component ($b_1$) and mixed alcohol component ($b_2$) and having a softening point of less than 30° C. and solvent-soluble at room temperature.

($b_1$) Mixed dibasic acid component:
   (i) 40-60% by weight of phthalic acid,
   (ii) 30-60% by weight of at least one diabasic acid selected from the group consisting of maleic and fumaric acids, and
   (iii) 0-30% by weight of a dibasic acid other than those indicated in (i) and (ii), above.

($b_2$) Mixed alcohol component:
   (iv) 60-80% by weight of propylene glycol,
   (v) 10-20% by weight of at least one polyhydric alcohol selected from the group consisting of ethylene glycol and diethylene glycol, and
   (vi) 10-20% by weight of a polyhydric alcohol other than those indicated in (iv) and (v), above.

The foregoing resinous components of (A and (B) are prepared by methods known per se. As the diallyl phthalate prepolymer of (A) that whose number average molecular weight is less than about 25,000, and usually about 10,000, is used. On the other hand, as the polyesters of (B) obtained from the mixed acid component ($b_1$) and the mixed alcohol component ($b_2$), the unsaturated polyesters having a softening point of less than 30° C. and solvent-soluble at room temperature are used.

As the dibasic acids of (iii), above, which can be contained in the aforesaid mixed component ($b_1$), mention can be made of such dibasic acid as isophthalic acid, terephthalic acid, tetrachlorphthalic anhydride, tetrahydrophthalic anhydride, chlorinated maleic acid, mesaconic citraconic acid, adipic acid, succinic acid, itaconic acid, glycolic acid, sebacic acid, 3,6-endomethylene tetrahydrophthalic acid and 3,6-endochloromethylenetetrachlorophthalic acid. On the other hand, as the polyhydric alcohols of (vi), above, which can be contained in the mixed alcohol component, included are such polyhydric alcohols as dipropylene glycol, 1,3-butylene glycol, 2,3-butylene glycol, bisphenol, dioxyethyl ether, bisphenol dioxypropyl ether, neopentyl glycol, 1,4-butenediol, trimethylolpropane, glycerine and pentaerythritol.

As in the case with the conventional resin impregnated dry sheet, an organic peroxide catalyst and a release agent are also contained in a suitable amount. As the impregnating solution is used a homogeneous organic solvent solution containing 100 parts by weight of the resinous component (A), 20-80 parts by weight of the resinous component (B) and 0.1-3 parts by weight of a release agent.

As the organic peroxide, included are benzoyl peroxide, tertiary butyl peroxide, and other catalysts which are effective at the curing temperatures which do not cause decomposition during the step of drying the impregnated paper.

On the other hand, as the release agent either the internal or external release agent can be used. As such a release agent, INT-11A (mfd. by the Axcel Plastic Company, U.S.A.) is recommended. If desired, useable also are carnauba wax or beeswax.

On the other hand, the organic solvent to be used in preparing the impregnating solution may be any which dissolves the diallyl phthalates prepolymer and does not precipitate the polyester which has a soften point of less than 30° C. and is solvent-soluble at room temperature. And it is preferably one which readily volatilizes for facilitating the drying of the resin-impregnated sheet. As such a solvent, mention can be made of the ketones such as acetone, methyl ethyl ketone and methyl isobutyl ketone, the aromatic compounds such as benzene, toluene, xylene and isopropylbenzene, the esters such as ethyl acetate and butyl acetate, and the other known solvents and the combinations thereof.

According to this invention, since one of the resinous components (B) is a polyester which has a softening point of less than 30° C. and is solvent-soluble at room temperature, a homogeneous solution can be obtained even when the amount of solvent is quite small. Moreover, since it dissolves and mixes intimately in a short period of time at room temperature, there is no need at all to carry out the mixing under heating conditions which might possibly cause troublesome interactions to occur between the two resinous components (A) and (B). Hence, the operation of preparing the resin solution for impregnation use is simplified and the unforeseeable denaturation of the resinous components used in preparing the impregnating solution can be completely avoided, with the consequence that an impregnating solution of uniform quality can be obtained to become a great advantage from the standpoint of quality control. Further, a smaller amount of the solvent will do, and this simplifies the subsequent drying of the impregnated sheet. Again, the adjustment of the viscosity of the impregnating solution is also made much easier. Thus, many advantages are had in the use of the aforesaid polyester as one of the resinous components of the invention. As previously indicated, papers, cloths or the like are utilized as the sheet to be impregnated with the impregnating solution. According to this invention, the sheet is impregnated with the impregnating solution in an amount such that the solids content of the two resinous components (A) and (B) ranges about 35–60% by weight, normally 45–58% by weight, and preferably 50–55% by weight, based on the weight of the resin-impregnated sheet after its drying. There is the advantage that excellent laminates are provided with a minimum amount of the resin. These advantages have been achieved by using the invention impregnating solution in which an unsaturated polyester which is solvent-soluble at room temperature has been used without the addition of diallyl phthalate monomer. Thus, the previously mentioned technical problems which were created heretofore because of the fact it was necessary to add a small amount of monomer in carrying out the molding operation when using diallyl phthalate prepolymer as the resinous component are solved and, in addition, this invention has contributed to a further shortening of the molding cycle as well as a further reduction of the production cost. The impregnation of the sheet with the impregnating solution can be accomplished by the use of customary equipment and technique. The impregnation operation is carried out at room temperature, followed by evaporation of the solvent to obtain the resin-impregnated dried sheet. The drying is usually carried out until the residual solvent in the resin-impregnated sheet becomes less than about 5% by weight.

When the amount of polyester in the impregnating solution is below the lower limit specified by this invention, the cure promotive effect and the flow improvement effect during molding are not had, whereas when the upper limit is exceeded, the desirable properties of the diallyl phthalate resin are adversely affected by the polyester properties, and the cure promotive effect also becomes inadequate. If desired, the impregnating solution can be incorporated with a colorant or decorative insoluble powders, e.g. metallic flaky powders, mica and the like. Further, n-propyl gallate, p-benzoquinone, tetramethylthiuram disulfide, hydroquinone and motoquinone can also be incorporated in a minute amount of the order of 0.01–0.1 part by weight, based on the organic peroxide. The resulting resin-impregnated sheet can be stored stably for a prolonged period of time. The impregnated sheet can be used to make a decorative laminate board by overlaying it on either one or both sides of a substrate and then molding the layup by heating it under pressure. As the substrate, included are, for example, plywood, hardboard, particle board, cement-asbestos, gypsum board and the like. The molding temperature, pressure and time can be varied suitably. In short, the molding is carried out at a temperature, pressure and time sufficient for curing the diallyl phthalate resin. For example, employed are molding temperature of 110–140° C., a pressure of 7–22 kg./cm.$^2$ and a molding time of about 3–10 minutes, usually 3–5 minutes.

In carrying out the molding operation using the invention resin-impregnated sheet, the most advantageous is the short period molding by means of the hot-hot cycle. Moreover, the superior effects of the invention sheet is best demonstrated by this technique.

The hot-hot cycle technique is a method which comprises maintaining the heating platen of the molding press and, as required, the mirror plate and the cushion as well at a prescribed temperature, overlaying the substrate and the dry resin-impregnated sheet and inserting the resulting layup while the press is hot and thereafter removing the molded board while the press is still hot.

When the conventional sheet was used with this method, numerous molding imperfections, particularly defects such as pockmarks, dull spots and swells appeared. On the other hand, when it was attempted to avoid these difficulties, the short period molding, which is the aim of the hot-hot cycle technique, could not be attained.

The present invention makes it possible to shorten the molding cycle advantageously and to manufacture with high efficiency and good reproducibility a decorative laminate board having an excellent surface gloss and smoothness and without any such defects as the hereinbefore described pockmarks, etc.

The following examples, along with comparisons, are given for illustrating several modes of practicing the invention method.

Example 1 and Comparisons 1–7

As the resinous component, 100 parts of diallyl phthalate prepolymer of a molecular weight of about 10,000 and 30 parts by weight of an unsaturated polyester (acid value 45) of a softening point 20° C. obtained by reacting a mixed acid component ($b_1$) consisting of:

|   | Wt. percent |
|---|---|
| Phthalic anhydride | 50.0 |
| Maleic anhydride | 23.5 |
| Fumaric acid | 7.4 |
| Chlorinated maleic acid | 19.1 | with a mixed alcohol component ($b_2$) consisting of:

|   | Wt. percent |
|---|---|
| Propylene glycol | 80.2 |
| Ethylene glycol | 9.1 |
| Diethylene glycol | 10.7 | in a weight ratio $b_1/b_2=1.58$ were dissolved in 120 parts by weight of acetone, along with 4 parts by weight of benzoyl peroxide and 0.5 part by weight of an internal release agent INT–11A, to prepare the impregnating solution. Using this solution, a 45 g./m.$^2$ paper printed with a pattern was coated by the "dip and flow" method followed by drying to obtain a resin-impregnated sheet for lamination use having a resin solids content of 51% by weight based on the resin-impregnated dried sheet.

This sheet was overlaid on a lauan plywood 4 mm. in thickness and was molded under the following conditions using a hot press having a 3-mm.-thick Duralumin mirror plate suspended and fixed to a heating platen via a 5-mm.-thick rubber cushion.

| Molding temperature | 130° C. |
|---|---|
| Molding pressure | 15 kg./cm.$^2$ |
| Molding time | 3.0 minutes. |

The results obtained are shown in Table I. By way of comparison, in the table are also shown those instances where the experiment was carried out in the same manner except that the resin was varied and hence the required molding time differs. The proportion of the amounts used of the catalyst and release agent to the resin was of an identical ratio in all instances.

NOTE

(1) Preparation of samples

The hot-hot molding was carried out for 5 times with a 10-stage press of the successive opening and closing type, and a total of 50 sheets of decorative boards 3' x 6' in size was prepared.

(2) Tests

(2-1) Resistance to chloroform test

Wads of chloroform-impregnated absorbent cotton were placed in different zones of each of the aforesaid 50 sheets of decorative boards. The spots where the cotton wads were placed were covered with Petri dishes and the boards were allowed to stand thus for 20 minutes. Then the spots were wiped and inspected. The sheets having spots where the surface was attacked were awarded the (−) mark and the sheets having spots showing no change were awarded the (+) mark, the number of sheets deserving of these marks in each experiment being indicated in parenthesis in the table.

(2-2) Pockmark rate

The areas of the groups of pockmarks on the surfaces of the aforesaid 50 sheets of decorative boards were measured with an integrator. The area occupied by the groups of pockmarks as against the total surface area of the boards, expressed in percentage, is the pockmark rate.

(2-3) Rate of rejects

The rate of rejects is the number of those sheets which have been rejected on account of their poorness of surface condition and lack of resistance to chloroform out of the 50 sheets, expressed in percentage.

TABLE I

| Experiment | Diallyl phthalate Polymer (parts by wt.) | Unsaturated polyester Monomer (parts by wt.) | Unsaturated polyester Softening point (°C.) | Unsaturated polyester Parts by wt. | Molding time (min.) | Resistance to solvents | Pockmark rate of molding product (percent) | Number of sheets in which pockmarks appeared | Rate of rejects (percent) |
|---|---|---|---|---|---|---|---|---|---|
| Example 1 | 100 | | 20 | 30 | 3 | +(50) | 0 | 0 | 0 |
| Comparison: | | | | | | | | | |
| 2 | 95 | 5 | 20 | 30 | 3 | +(50) | 12 | 27 | 54 |
| 3 | 100 | | | | 10 | +(50) | 0 | 0 | 0 |
| 4 | 100 | | | | 7 | −(50) | 0 | 0 | 100 |
| 5 | 95 | 5 | | | 7 | +(25) | 0 | 11 | 70 |
| 6 | 95 | 5 | 40 | 30 | 5 | −(50) | 2 | 13 | 100 |
| 7 | 100 | | 40 | 30 | 3 | −(50) | 11 | 24 | 100 |

NOTE.—The unsaturated polyester used in Example 1 and Comparison 1 was that indicated as B-1 in the subsequently presented Table II; the unsaturated polyester used in Comparisons 6 and 7 was that indicated as B-4 in Table III.

TABLE II

| Experiment | Diallyl phthalate prepolymer (parts by wt.) | Polyester Class | Polyester Parts by wt. | Organic peroxide Name | Impregnating solution Parts by wt. | Internal release agent Name | Internal release agent Parts by wt. | Solvent Name | Solvent Parts by wt. | Resin solids content based on impregnated dry sheet (wt. percent) | Molding time (min.) (at 130°C., 15 kg./cm.²) | Resistance to solvents | Rate of rejects (percent) |
|---|---|---|---|---|---|---|---|---|---|---|---|---|---|
| Comparison: 8 | 100 | B-1 | 11.1 | BPO | 3.3 | INT-11A¹ | 0.44 | Acetone | 111 | 50²(80) | 4 | −(50) | 100 |
| 9 | 100 | B-1 | 11.1 | BPO | 3.3 | INT-11A¹ | 0.44 | do | 111 | 50(80) | 7 | +(50) | 0 |
| Example: 2 | 100 | B-1 | 25 | BPO | 3.8 | INT-11A¹ | 0.5 | do | 119 | 50(80) | 4 | +(50) | 0 |
| 3 | 100 | B-1 | 42.8 | BPO | 4.3 | INT-11A¹ | 0.57 | do | 129 | 50(80) | 4 | +(50) | 0 |
| 4 | 100 | B-1 | 66.7 | BPO | 5.5 | INT-11A¹ | 0.66 | do | 138 | 50(80) | 4 | +(50) | 0 |
| Comparison: 10 | 100 | B-1 | 100 | BPO | 6 | INT-11A¹ | 0.8 | do | 150 | 50(80) | 4 | −(50) | 100 |
| 11 | 100 | B-1 | 100 | BPO | 6 | INT-11A¹ | 0.8 | do | 150 | 50(80) | 6 | +(50) | 34 |
| Example: 5 | 100 | B-2 | 20 | BPO | 4 | INT-11A¹ | 0.5 | Acetone / Toluene | 80 / 40 | 54(60) | 3 | +(50) | 0 |
| 6 | 100 | B-2 | 20 | BPO | 4 | Laurie acid | 3.0 | Acetone / Toluene | 80 / 40 | 54(60) | 3 | +(50) | 0 |
| 7 | 100 | B-3 | 40 | BPO | 4 | do | 3.0 | MEK | 130 | 48(80) | 5 | +(50) | 0 |
| 8 | 100 | B-3 | 60 | t-BPB | 5 | INT-11A¹ | 0.65 | Acetone / Toluene | 70 / 60 | 58(80) | 3 5 | +(50) | 0 |
| 9 | 100 | B-2 | 25 | t-BPB | 4 | INT-11A¹ | 0.5 | Acetone / MIBK | 100 / 30 | 39(80) | 3 5 | +(50) | 0 |
| 10 | 100 | B-2 | 70 | BPO | 5 | INT-4⁴ | 0.7 | MEK | 150 | 55(45) | 5 | +(50) | 0 |
| 11 | 100 | B-5 | 20 | BPO | 2 | INT-11A¹ | 0.4 | Acetone | 120 | 50(80) | 5 4 | +(50) | 0 |
| 12 | 100 | B-6 | 30 | Dicumylperoxide | 3 | INT-4⁴ | 0.4 | do | 100 | 50(80) | 5 | +(50) | 0 |
| 13 | 100 | B-7 | 50 | t-BPB | 5 | Laurie acid | 3.0 | Acetone / Toluene | 110 / 40 | 55(60) | 3 | +(50) | 0 |
| Comparison 12 | 100 | B-8 | 20 | BPO | 4 | INT-11A¹ | 0.5 | Acetone / Toluene | 100 / 80 | 50(80) | 3 | +(50) | ⁶100 |

¹ Internal release agent from Axcel plastics Co. in U.S.A.
² Weight of pattern paper (g./m²).
³ 150° C.
⁴ Internal release agent from Axcel plastics Co. in U.S.A.
⁵ 120° C.
⁶ Surface condition poor.

Examples 2-13 and Comparisons 8-12

Except that the diallyl phthalate prepolymer A, the polyester B, the compositions of the impregnating solutions and the molding conditions were varied, the experiments were carried out as in Example 1 with the results shown in Table II. By way of comparison, several instances not satisfying the conditions required by this invention have also been presented. The particulars of the polyesters used in these experiments are given in Table III.

We claim:

1. A resin-impregnated dried sheet for lamination use, said sheet obtained by being impregnated with a subsequently defined impregnating solution such that its resin solids content is in the range not less than 35 percent by weight but less than 60 percent by weight based on the weight of the resin-impregnated dried sheet, the organic solvent in said sheet after drying being about 5 percent by weight based on said sheet, said impregnating solution containing as its resinous component:

(A) one hundred parts by weight of diallyl phthalate prepolymer, and (B) twenty to eighty parts by weight of a polyester obtained from the following reacted mixture consisting of:
  (i) 40-60% by weight of phthalic acid,
  (ii) 30-60% by weight of at least one dibasic acid selected from the group consisting of maleic acid and fumaric acid, and
  (iii) 0-30% by weight of a dibasic acid other than those indicated in (i) and (ii), above; and an alcohol component consisting of:
  (iv) 60-80% by weight of at least one polyhydric alcohol selected from the group consisting of ethylene glycol and diethylene glycol, and
  (v) 0-20% by weight of a polyhydric alcohol other than those indicated in (iv), above;

said polyester having a softening point not over 30° C., and said polyester being solvent-soluble at room temperature;

(C) and a catalytic amount of a catalyst which is effective at curing temperatures but which does not decompose during the drying of the impregnated sheet.

References Cited

UNITED STATES PATENTS

| | | | |
|---|---|---|---|
| 3,154,454 | 10/1964 | Dupuis | 156—332 |
| 3,331,891 | 7/1967 | Thomas et al. | 260—862 |
| 3,441,535 | 4/1969 | Beacham et al. | 260—40 |
| 3,509,019 | 4/1970 | Beacham | 161—251 |
| 3,547,770 | 12/1970 | Greenspan | 161—251 |

OTHER REFERENCES

Beacham et al.: "How to Formulate Heat Resistant DAP Polyesters," Plastics Technology, vol. 9, No. 5 (May 1963), pp. 44-46.

WILLIAM J. VAN BALEN, Primary Examiner
R. A. DAWSON, Assistant Examiner

U.S. Cl. X.R.

117—161 K; 161—233, 251; 260—862, 873

TABLE III

| Class of polyester | Mixed acid component (b₁) | | | Mixed alcohol component (b₂) | | | | b₁/b₂ ratio (wt. ratio) | Softening point of polyester (°C.) | Acid value, polyester |
|---|---|---|---|---|---|---|---|---|---|---|
| | (i) Phthalic anhydride (as phthalic acid) (wt. percent) | (ii)a Maleic anhydride (as maleic acid) (wt. percent) | (ii)b (iii) Fumaric acid (wt. percent) Other dibasic acids (wt. percent) | (iv) Propylene glycol (wt. percent) | (v)a Ethylene glycol (wt. percent) | (v)b Diethylene glycol (wt. percent) | (vi) Other polyhydric alcohol (wt. percent) | | | |
| B-1 | 60.0 (51.0) | 23.5 (24.6) | 6.7 Chlorinated maleic acid (17.7) | 80.0 | 9.3 | 10.7 | | 1.52 | 20 | 46 |
| B-2 | 53.8 (53.1) | 40.6 (41.5) | | 70.0 | 4.0 | 6.0 | Dipropylene glycol (20.0) | 1.72 | 25 | 43 |
| B-3 | 60.0 (60.2) | 27.6 (29.0) | 10.8 Adipic acid (5.4) | 67.0 | | 20.0 | Dipropylene glycol (13.0) | 1.42 | 27 | 51 |
| B-4 | 60.0 (57.0) | 40.0 (43.0) | | 100.0 | | | | 1.62 | 40 | 25 |
| B-5 | 43.4 (42.1) | 53.8 (55.5) | Tetrahydrophthalic anhydride (2.4) | 65.0 | | 16.0 | Glycerine (19.0) | 1.39 | 25 | 33 |
| B-6 | 46.0 (43.7) | 50.0 (51.9) | 3,6-endodichloromethylenetetrachlorophthalic acid (4.4) | 80 | | 20.0 | | 1.37 | —5 | 55 |
| B-7 | 45.0 (43.4) | 55.0 (56.6) | | 70.0 | | 20.0 | Trimethylolpropane (10.0) | 1.22 | 10 | 42 |
| B-8 | 30.0 (28.6) | 70.0 (71.4) | | 50.0 | | 50.0 | | 1.23 | 60 | 18 |

UNITED STATES PATENT OFFICE
CERTIFICATE OF CORRECTION

Patent No. 3,709,777　　　　　　　　　Dated Jan. 9, 1973

Inventor(s) Toshio Takikawa, Kouji Satomo and Takashi Kodama

It is certified that error appears in the above-identified patent and that said Letters Patent are hereby corrected as shown below:

Please insert in the heading of the subject patent the following:

claims　priority of Japanese application No. 75310/67 of November 22, 1967

Signed and sealed this 29th day of May 1973.

(SEAL)
Attest:

EDWARD M. FLETCHER, JR.
Attesting Officer

ROBERT GOTTSCHALK
Commissioner of Patents